US009509788B2

(12) United States Patent
Pal et al.

(10) Patent No.: US 9,509,788 B2
(45) Date of Patent: Nov. 29, 2016

(54) SOCIAL NETWORK GRAPH BASED SENSOR DATA ANALYTICS

(75) Inventors: Arpan Pal, Kolkata (IN); Chirabrata Bhaumik, Kolkata (IN); Avik Ghose, Kolkata (IN); Priyanka Sinha, Kolkata (IN)

(73) Assignee: Tata Consultancy Services Limited (IN)

(*) Notice: Subject to any disclaimer, the term of this patent is extended or adjusted under 35 U.S.C. 154(b) by 328 days.

(21) Appl. No.: 14/124,701

(22) PCT Filed: Jun. 4, 2012

(86) PCT No.: PCT/IN2012/000392
§ 371 (c)(1),
(2), (4) Date: Dec. 6, 2013

(87) PCT Pub. No.: WO2013/051009
PCT Pub. Date: Apr. 11, 2013

(65) Prior Publication Data
US 2014/0101255 A1    Apr. 10, 2014

(30) Foreign Application Priority Data
Jun. 9, 2011 (IN) .......................... 1691/MUM/2011

(51) Int. Cl.
G06F 15/16      (2006.01)
H04L 29/08      (2006.01)
G06Q 30/02      (2012.01)
G06Q 50/00      (2012.01)

(52) U.S. Cl.
CPC .......... *H04L 67/22* (2013.01); *G06Q 30/0201* (2013.01); *G06Q 50/01* (2013.01)

(58) Field of Classification Search
CPC ... G06Q 30/0201; G06Q 50/01; H04L 67/22
USPC .................................................. 709/204–229
See application file for complete search history.

(56) References Cited

U.S. PATENT DOCUMENTS 7,567,916 B1*  7/2009  Koeppel ............... G06Q 30/02
                                                      705/14.45
7,734,680 B1*  6/2010  Kurapati ........... G06F 17/30035
                                                      709/203
7,856,411 B2   12/2010  Darr
(Continued)

FOREIGN PATENT DOCUMENTS

WO    WO 01/24047    4/2001

OTHER PUBLICATIONS

Aggarwal et al., Social Network Data Analytics, Integrating sensors and social network 2011, pp. 379-411.*

(Continued)

*Primary Examiner* — Moustafa M Meky
*Assistant Examiner* — Thorne E Waugh
(74) *Attorney, Agent, or Firm* — Finnegan, Henderson, Farabow, Garrett & Dunner, LLP

(57) ABSTRACT

The present invention relates to a system and method of effective physical data aggregation and its logical analytics by way of utilizing socially interacting and networking platforms to create meaningful association and relevancy between the captured physical data. The physical data associated by social networking platforms results in creation of reduced data set for analytics and requires low processing requirements for application usage.

20 Claims, 4 Drawing Sheets

(56) References Cited

U.S. PATENT DOCUMENTS

| | | | |
|---|---|---|---|
| 2009/0254633 A1 | 10/2009 | Olive et al. | |
| 2009/0282047 A1 | 11/2009 | Lin et al. | |
| 2010/0023300 A1* | 1/2010 | Farry | G06Q 10/10 702/181 |
| 2010/0299615 A1 | 11/2010 | Miluzzo et al. | |
| 2011/0072052 A1 | 3/2011 | Skarin et al. | |
| 2011/0276631 A1* | 11/2011 | Schmitt | G06Q 10/105 709/205 |
| 2012/0105214 A1* | 5/2012 | Sanders | H04L 67/327 340/10.42 |
| 2012/0232998 A1* | 9/2012 | Schoen | G06Q 10/10 705/14.66 |
| 2012/0266191 A1* | 10/2012 | Abrahamsson | G06Q 30/0224 725/35 |

OTHER PUBLICATIONS

HaoYang et al., Pub. No. CN 20191985907 U, Sensor network system.*

Krontiris et al., Integrating people-centric sensing with social networks: A privacy research agenda, 2010 IEEE, pp. 620-623.*

Mori et al., "Real-world Oriented Information Sharing Using Social Networks".

Campbell et al., "The Rise of People-Centric Sensing," IEEE Internet Computing (Jul./Aug. 2008).

Musolesi et al., "An Ad Hoc Mobility Model Founded on Social Network Theory," Proceedings of the $7^{th}$ ACM International Symposium on Modeling, Analysis and Simulation of Wireless and Mobile Systems (MSWiM '04), Venezia, Italy, pp. 20-24 (Oct. 4-6, 2004).

Choudhury et al., "Characterizing Social Networks using the Sociometer," Proceedings of NAACOS (2004).

Pai et al., "Using Social Network Theory Towards Development of Wireless Ad Hoc Network Trust," IEEE International Conference on Advanced Information Networking and Applications Workshops (AINAW '07), pp. 443-450 (2007).

Choudhury et al., "The Sociometer: A Wearable Device for Understanding Human Networks," Computer Supported Cooperative Work—Workshop on Ad hoc Communications and Collaboration in Ubiquitous Computing Environments (Nov. 2002).

Houghton et al., "Command and control in emergency services operations: A social network analysis," Ergonomics, pp. 1204-1225 (Oct. 10-22, 2006).

Notification Concerning Submission, Obtention or Transmittal of Priority Document issued on Jan. 29, 2013 in International Application No. PCT/IN2012/000392.

International Search Report mailed Apr. 23, 2013, in International Application No. PCT/IN2012/000392.

* cited by examiner

SOCIAL NETWORK GRAPH BASED SENSOR DATA ANALYTICS

CROSS-REFERENCE TO RELATED PATENT APPLICATIONS

This application is a National Stage Entry of International Application No. PCT/JP2012/000392, filed Jun. 4, 2012, which claims priority from Indian Patent Application No. 1691/MUM/2011, filed Jun. 9, 2011. The entire contents of the above-referenced applications are expressly incorporated herein by reference.

FIELD OF THE INVENTION

The present invention generally relates to the field of data analytics, and more particularly to a method and system of accumulating and analyzing sensor data by utilizing social networking structure to create a reduced sensor data set for its effective analytics.

BACKGROUND OF THE INVENTION

Till date Internet-of-Things (IoT) has played a part in social networking only to extract and understand the context of the user to make effective updates or provide relevant applications. However, there are no existing solutions that allow users to define relationship between various sensors or provide a platform where applications can be developed to draw such relations based on certain business logic.

Accordingly, an effective and quick analytics system for enabling continuous process improvement by performing analytics on data to support variety of socially derived applications and information networks is desired. More accuracy, for such cases, can be provided by effective mining and analytics of sensor data which can facilitate modeling of underlying relationships and interactions in social network construction. Modeling of large amount of real time data captured by means of sensors to derive understanding about socially interacting elements have the potential to enrich the decision making behavioral pattern of socially interacting elements.

However, an independent social network of sensors, which can be used for reduction of sensor data set for analytics, have not been existing till date. All existing prior arts which attempts to link various sensors through social networks only reflects the ways by which sensor data can contribute to a user's social context like location/activity etc. However, using social network theory and applying it to a sensor network to allow more efficient data mining based on specific use cases is not available.

The purpose of having the reduced data set using social networking structure is to make it efficiently searchable for concluding interesting inferences based on the social and behavioral patterns of the interacting elements sharing familiarity and common interest.

Moreover, the problem of failing sensor networks in relating multiple sensor data effectively which could cause analytics to run only on those sensors which are relevant to that particular instance of the application, needs to be addressed. Also, when the application needs to use multiple distributed sensor data for analytics, it requires a huge set of gathered data from all possible sensors for its effective mining.

In the light of foregoing, there exists a need for a system and method whereby relevant sensors can be connected together in a social network paradigm to constitute a reduced data set for effective analytics which can address ever increasing number of challenges associated with socially-centered applications.

OBJECTS OF THE INVENTION

In accordance with the present invention, a rich and flexible sensor data analytics system and method using social networking graphs for connecting relevant sensors is provided.

It is an object of the present invention to use social network like connected graphs for generating set of related sensors based on familiarity and common interest.

It is an object of the present invention to provide a system and method for producing reduced set of related sensors by utilizing social networking structures for its effective analytics and mining.

Another object of the present invention is to provide rich sensor data analytics by way of modeling the human associated relationships and interactions.

It is an object of the invention to enable real time integration of social networks and sensor data to develop increased understanding of behavioral pattern of interacting humans in order to achieve a common goal.

One of the other object of the present invention is to facilitate the system in generating logical business decisions by providing rich sensor data capable of mapping and modeling various interactive information in a socially connected network.

SUMMARY OF THE INVENTION

The present invention provides a system and method of effective accumulation and analytics of sensor data by utilizing social networking structure for creating a reduced set of related sensor data.

Accordingly, a system to socially network multiple sensors is implemented which comprises of: a sensor social network further comprising user profiles, sensor information having various data points and associated data values and an identity association module capable of establishing relationship between the relevant sensor information based on certain set of determining parameters associated with user profile; an aggregator entrusted with transformation of sensor data to create relevant and formalized sensor information for posting on sensor social network; and an analytical engine which receives reduced set of related sensor information to derive a logical interpretation thereof.

One of the other aspect of the present invention provides a sensor data accumulation and analytics method which is executed to socially connect set of sensor data in the steps of: allowing multiple users to share their profile associated with sensor data, on a social sensor network; transforming the set of sensor data into formalized sensor information by aggregator; associating formalized group of sensor information based on deterministic parameters and eventually transmitting the reduced set of formalized and filtered sensor information for logical interpretation by analytical engine.

DETAILED DESCRIPTION OF THE INVENTION

Figure 1:
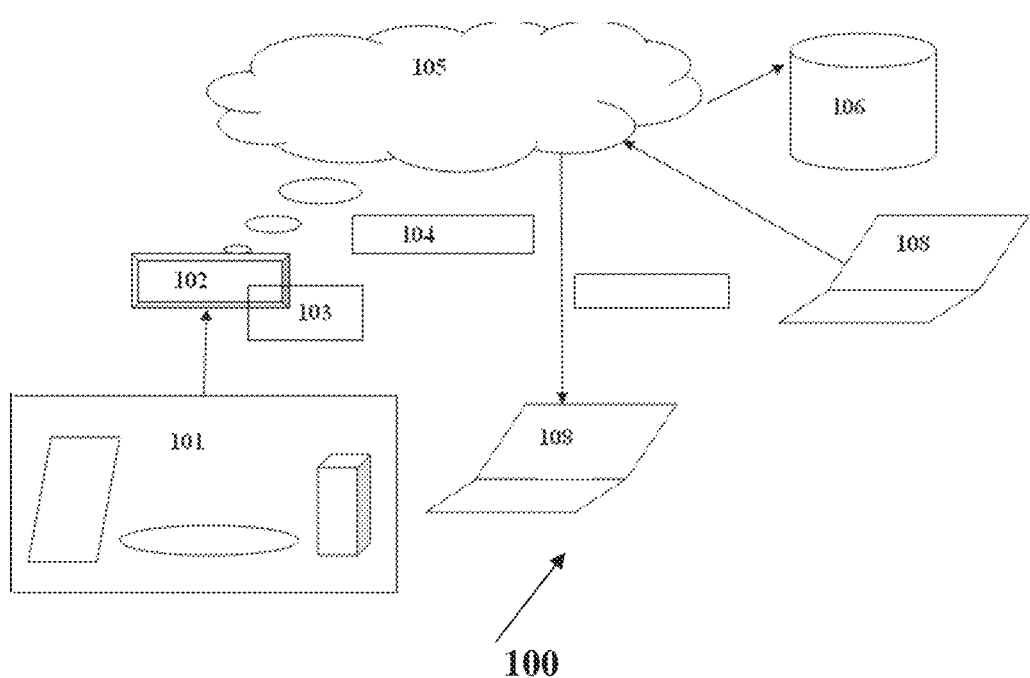
FIG. 1 is a principle block diagram of social network based sensor data accumulation and analytics system in accordance with one exemplary embodiment of the present invention.

Before the present method, system and communication enablement are described, it is to be understood that this invention is not limited to the particular methodologies, and hardware and network described, as these may vary within the specification indicated. It is also to be understood that the terminology used in the description is for the purpose of describing the particular versions or embodiments only, and is not intended to limit the scope of the present invention, which will be limited only by the appended claims. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. The disclosed embodiments are merely exemplary methods of the invention, which may be embodied in various forms.

As used in this application, the terms "component/module" and "system" and the like are intended to refer to a computer-related entity, either hardware, a combination of hardware and software, software, or software in execution. For example, a component/module may be, but is not limited to being, a process running on a processor, a processor, an object, an instance, an executable, a thread of execution, a program, and/or a computer. By way of illustration, both an application running on a computer and the computer can be a component. One or more components/modules may reside within a process and/or thread of execution and a component/module may be localized on one computer and/or distributed between two or more computers.

Human-centric Social network allows graphical connect of individuals either based on familiarity or a common interest or cause. This facilitates the people centric technologies as they have to now operate on a much smaller or reduced data set. Extending this analogy to sensor networks, if sensors can be clubbed into meaningful social groups, it can reduce the sensor data analytics and processing requirements for an application by a huge order.

The present invention presents a system for effective analytics of sensor data set by application of social networking theory for application usage. The system of the present invention elegantly connects relevant sensors together in a social network paradigm using some common criterions enlisted briefly as follows:

a) Common owner—It is very clear that all sensors belonging to a common individual, family or enterprise shall have to be connected through a maximum trust zone so that they can share data between themselves.

b) Shared owner—There may be cases where sensors, typically surveillance systems and alarms, may be owned by a group of people shares an apartment complex. In such cases all such sensor data should be made available to all the people in the apartment.

c) Common motive—Very much likes the "special interest groups" or communities in a social network, there are sensors that share a common interest and hence shall be sharing data amongst themselves. For example, cars travelling on the same route might be interested to share traffic data because all the cars would keep the long term goal of avoiding busy roads.

d) Application based sharing—Similar to facebook applications, the sensor network shall have applications, which would perform a particular goal with the sensor data and all interested individuals can grant access to the application for analytics of that data. One such example could be a car pool application which will gather GPS and accelerometer data from interested vehicle owners, and then use a time based analysis of the same to figure out potential car pool buddies.

The sensors connected through a common social application based on some of the above enlisted criterions constitutes a reduced set and can be therefore analyzed more efficiently without reducing the analytics outcome as opposed to unrelated sensors which have to be filtered based on location, usage etc. In social networking world, applications are typically analyzed by data analytics engine or by a collaborative effort and people installing the application into their social network actually just grant the engine access to their profile data and updates. Applying this theory to sensor world the present invention proposes an elegant system where common interest groups will be created who will share their sensor data in order to achieve a common goal. Since people using this application are expected to be a small subset of the total number of sensors, the analytic engine has now less work to do. This collaborative sharing and integrating of sensor networks with social networking realm also results in real time awareness of different users about each other and provide unprecedented information and understanding about global behavior of different users participating in the social network.

FIG. 1 illustrates a principle block diagram of social network based sensor data accumulation and analytics system 100. The figure explains inter-engagement of various constituting elements as deployed on the system 100. A group of sensors 101 of the system 101 provides data to a web based aggregator 102 that does some formatting or filtering of the sensor data by utilizing filters 103 embedded therein, before using social networking enabled web interface 104 like web 2.0 to post the data to the Internet cloud 105 which hosts the social network of sensors, interchangeably called as sensor social network. The filters 103 performs the task of first level reduction of data set based on certain user governed criterions. These criterions includes, though not limited to, declared interest or intent expressed by the users to use the application; the interest may further comprise brands, names, things, product, services, names, numeric identifier or their combinations. Based upon these criterions, a pre-formatting of sensor data is achieved thereby creating a reduced size of sensor data set.

Also various enterprise and individuals are able to deploy their applications to this cloud and there are renderers 108 (which may be any device with a screen and a network connection), can use a standard web interface to have different view of this data which is provided by the analytics engine 106 running on the cloud. The logical interpretation can then be broadcasted on a display interface (not shown in the figure).

Figure 2:
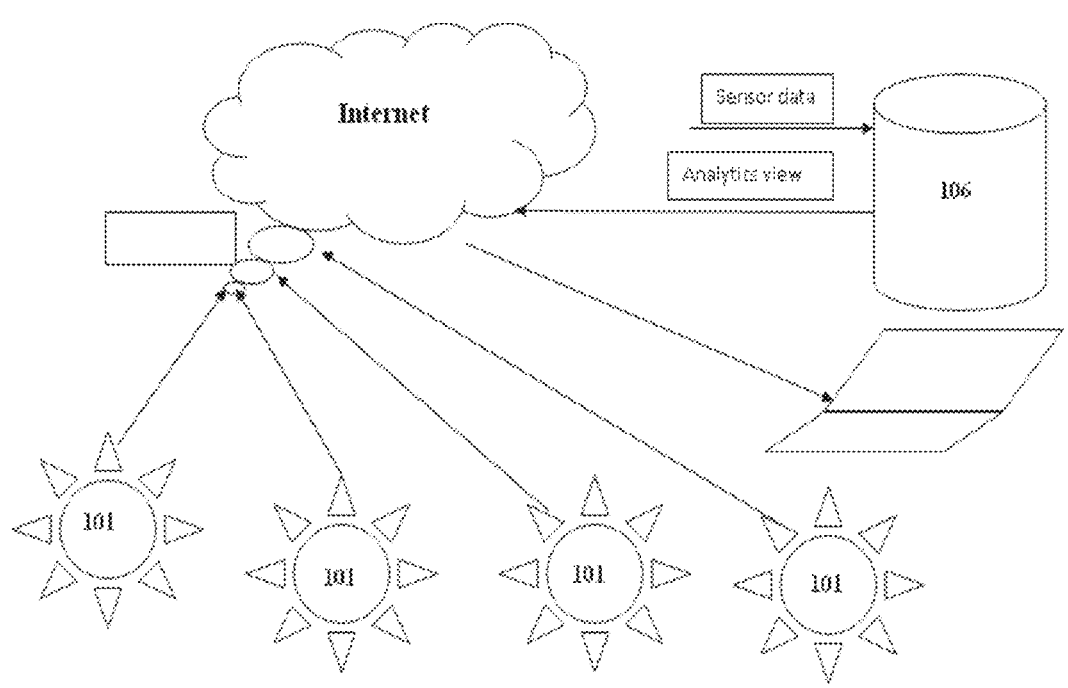
FIG. 2 depicts the current scenario of sensor networks as existing in the art.

The existing scenario of sensor networks and data analytics as depicted in FIG. 2 aggregates all the sensor associated physical data into an internet based sensor database upon which the analytics engine acts to provide a logical and meaningful interpretation. Therefore the data captured by the sensors gets accumulated to constitute a huge set with no defined relationships or connectivity by any common criterion, thereby making data analytics and processing a very tedious task.

Figure 3:
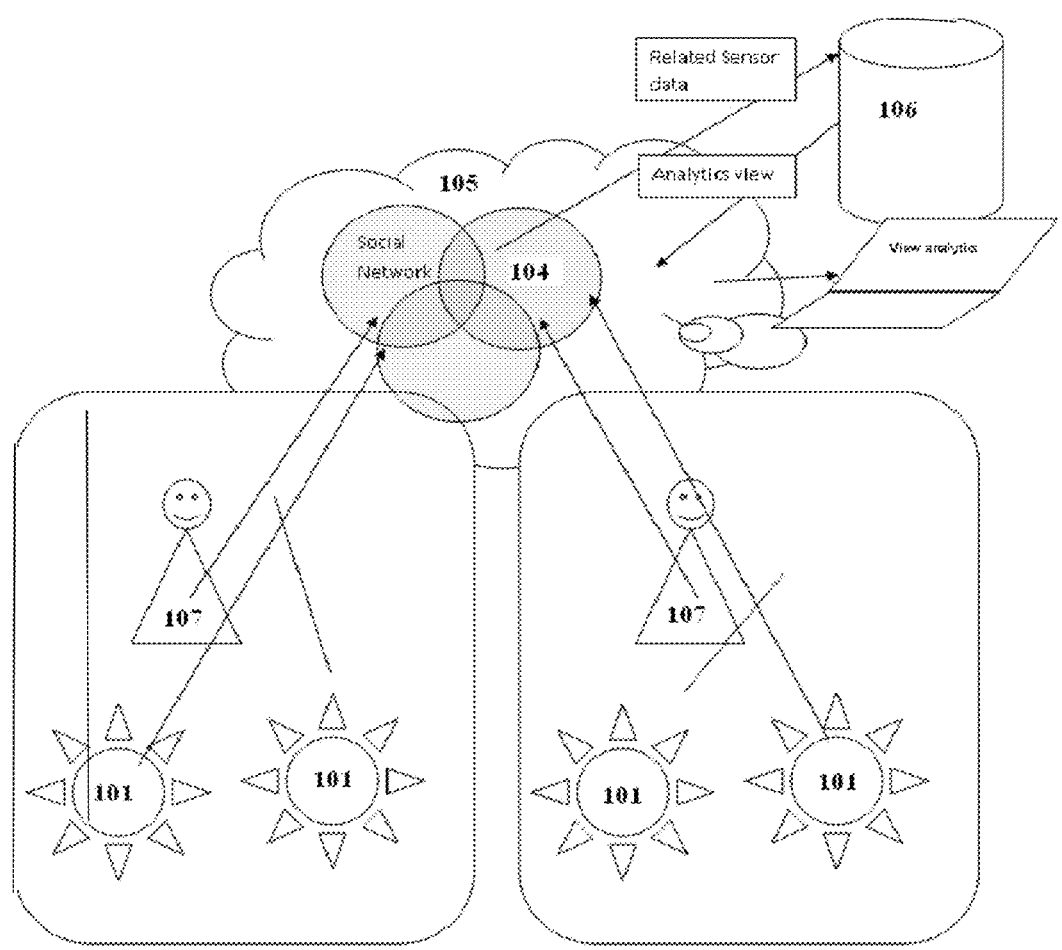
FIG. 3 presents principle architecture of the proposed system against the existing sensor based systems.

In accordance with one of the preferred embodiments of the present invention, principle architecture of the proposed system 100 against the existing sensor based systems is illustrated in FIG. 3. In the proposed architecture the group of sensors including physical, virtual and soft sensors 101 is typically "owned" by persons 107 who are connected via social networking. This social networking graph is now used as a rule based filtering for sensor data which is used by the analytics engine 106 to act upon. This makes the analytics engine 106 to operate upon a much reduced and related data set to produce effective results. Therefore use of this social networking graph explicitly reduces the complexity of sensor data analytics.

In a typical IoT (Internet of Things) architecture the sensors 101 are connected to aggregators 102 which are internet enabled as shown in FIG. 1. The heterogeneous nature of sensors 101 owned by people 107, shown in FIG. 3 prompts the use of a service oriented architecture for an application using sensor data, where sensors are grouped into services. It is also observed that sensors are typically associated with a person, community or an organization that owns the data generated by the sensors.

As shown in FIGS. 1 & 3, the aggregator 102 after filtering and formatting the data based on certain set of specified criterion, uses web-based API 104 to stream sensor data to the social sensor portal 105 on the internet. The uploaded data is associated with a "person" 107 who owns the sensors 101. For example, if, there are s sensors to be monitored belonging to p people and out of these people, i people (i<<p) share a common intent for these sensors using a social network, it is trivial to show that the proposed architecture of the system 100 reduces the size of the data set to be analyzed and improves the performance by a factor of (1−i/p). Apart from 'data reduction', a lot of interesting problems can be solved using the system proposed in the present invention.

For example, it can facilitate efficient implementations of queries like—'Find a friend who is physically closest to me in this city', or 'Do I have a friend of a friend who is also attending this conference?' All these queries can be answered if all people carry a GPS enabled device and are on a sensor social network. One can also get insights into behavior of a group of people connected via a social network like 'What is the total carbon footprint of my family?' or 'How much time does my family spend indoors on weekends'. Also, Filtering out irrelevant data points by the use of social networks results in higher quality answers when using heuristic analysis algorithms.

One of the preferred embodiments of the present invention presents a sensor social network system which comprises of different constituting modules to achieve social association amongst plurality of sensor information. There is provided a means to receive request on behalf of users associated with sensor information for sharing their profile information. The user profile information predominantly consists of user identification information; his associations with other users, for example friends, peers etc.; their intents, motives, purpose; information pertaining to sensors or group of sensors owned by users participating in social networking; including but not limited to information related with interested users with whom or who from their end are willing to share purposeful information.

For ease of explanation, the social network based related sensor group constituting the present system 100 will be described herein with reference to certain real time examples or embodiments.

For instance, consider a case of car pooling wherein a car pool finder application using only sensor data has to find common routes by finding patterns into the GPS sensors of people, and then match them against a time-line to figure out who are the people who travel from point A to point B at the same time to detect potential car pool buddies. However, all people travelling on that route may not have intent for car pooling. Further, people are may feel insecure travelling with a stranger.

If a car pool application is hosted on a social network, people who intend to car pool shall only join. Also, people who join can look into each other's social profiles and verify the identity of the person before accepting such a request. However, people might not correctly enter the time they leave source and reach the destination.

Using proposed architecture of the system 100, the first level filtering of sensor data is done based on intent and social connections and then only those many GPS sensors shall be analyzed for finding potential buddies which are found to be relevant and defined by a social relationship. Hence, now the number of data points involved in the calculation is much less. This makes final results more accurate and fruitful for the application.

Other supporting example to illustrate the working of the present system in accordance with one of the other embodiments of the present invention is a utility price notification environment in which the utility provider's uses smart meter data as input to notify their users of price hike when consumption is high during peak time. However, it does not take care of the intent of people to switch off their appliances in case the power prices hike for prime hours etc.

Using just the social network, the utility service provider can deploy a social network application and creates a community of all its users who show "intent" of switching off appliances in case of a power price hike. However, there is no mechanism of connecting the application with actual meters of the individuals interested. Hence, the price notifications generated by the application through analytics of collected demand and supply data are not accurate.

Using the proposed system 100, the social network application gets integrated with the actual smart-meters of the interested users. So all interested users, who has shown the common intent of receiving such service and are using high power appliances during the period of overload, will be notified of the overload and associated price hike. They can also view how much their peers will end up paying.

In another such example, the present system can be effectively deployed for vehicle bartering. For instance, in isolated stretches, vehicle may need to collaborate to achieve common goals, which may include vehicle to vehicle charging in case of EVMs. Also borrowing and lending of fuels, helping with tools and expertise in a breakdown instead of waiting for technical support to arrive, wherever possible is another way to collaborate. In usual scenario, the vehicle owner/driver makes a phone call to achieve support. In an IoT scenario, the sensors might call in for support and help from tech support as well as from nearby peers who are found using location sensors like GPS. However, when combined with social network based intent, all nearby people who are willing to help and also with a set of things (like tools, excess fuel) that they might have can be collaborated to seek help. This makes the application much more meaningful.

Another scenario can be in a restaurant where the challenge posed is to make effective seating arrangements for customers during the peak hours. This can be solved greatly using shared seating. However, whenever a customer is asked if he/she is willing to share the table, they are skeptical due to the idea of dinning with a stranger. If however, the location of guys in the wait queue is deduced using location sensors (like proximity sensors using ultrasound etc.), and then an alert is sent to the users at the table stating that somebody they know or of similar social background is in the queue (which might include shared interests), people will be more willing to share the table.

Other such scenario can be projected in case of instant TV rating wherein current TV rating and TRP uses sensors which are deployed by specific survey companies to collect data and do backend processing using extrapolation. However, the audio/video sensors in user's cell phone can detect the TV program and identify the same, and if this is combined with the intent of the users to share such data and also provide his own rating to the show, then the rating and TRP calculation of the TV shows can be performed on a much larger data-set and results can be achieved much faster.

In a certain embodiment, the benefits of using the above system can be demonstrated using sensor data from www.pachube.com and social networking data from www.facebook.com. Pachube is an online service to which sensor data can be uploaded. It provides a central repository for web based access of streaming sensor data. Each feed is associated with a number of data-streams. Each data-stream typically corresponds to one sensor. This data-stream has data-points that contain the current value, timestamp, max_value, min_value and units. The elevation, location and description of the sensor may also be available. This data is modifiable and accessible via a REST API. API keys can be generated to access this API programmatically. There are open source libraries in Java, JavaScript and other languages for the same.

Social networks like Facebook also has a REST API along with open source libraries in java, JavaScript and other languages. Using these APIs, one can access for a given user, his/her associations, profile information, preferences, comments, wall posts, followers, following and other such information. This allows analytics to know the intent of people with regards to a scenario.

Figure 4:
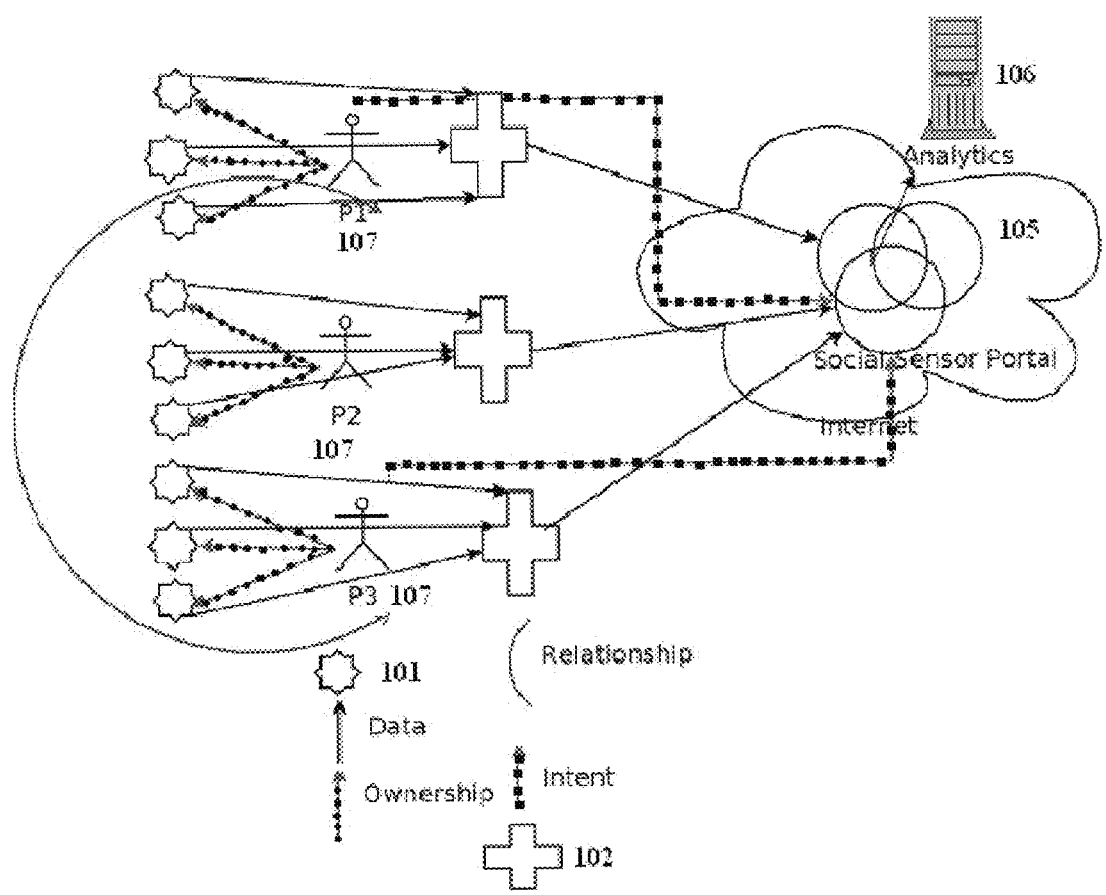
FIG. 4 is an example implementation of the system layout in accordance with one of the embodiment of the present invention.

To illustrate example implementation of the proposed system as shown in FIG. 4, it can be understood that the system 100 is configured to associate identities between Pachube sensor owners and Facebook users to create the augmented social sensor network. Facebook API provides the social context for the sensors. Pachube experiments are collected as "Feeds". These are identified by their feed-ids. Feed information in JSON format is available in Pachube. Feeds have associated tags that ease searching. The same feed is available in CSV and XML as well. A single data point can be tracked using such API. A trace of data points for a given time frame is useful as well.

The major advantageous feature of the present invention realized by integrating sensor networks with socially interacting platforms is deriving much faster and accurate results with less occupancy of computational resources. The other typical advantage is to the service providers who can use this sensor platform to provide applications to interested users by capturing their sensor data. Typical example of such a provider could be a vehicle insurance provider who wishes to provide its users with a dynamic premium policy based on their driving pattern. The driving pattern can be analyzed based on the accelerometer and GPS signals from user's vehicle. All the user needs to do is to install the insurance application on to his/her sensor profile and allow access of the same data to the service provider through a social network application.

Although the present invention has been shown and described with respect to several preferred embodiments thereof, various changes, omissions and additions to the form and detail thereof, may be made therein, without departing from the spirit and scope of the invention.

We claim:

1. A system for sensor data accumulation and analysis, the system comprising:
    a plurality of sensors adapted to generate sensor information, wherein each sensor is associated with one or more users related to each other;
    a sensor social network connecting the plurality of sensors, and storing a plurality of user profiles and the sensor information;
    an aggregator to formalize the sensor information by applying social networking graph as a rule based filtering on the sensor information and stream the formalized sensor information to corresponding sensor data fields stored on the sensor social network;
    an identity associator, deployed on the sensor social network, adapted to derive at least one association among the formalized sensor information based on at least one parameter related to at least one of the user profiles, user's interest or user's objective to determine related sensors from the plurality of sensors; and
    an analytical engine configured to analyze the sensor information of the related sensors and share the analyzed sensor information, among the related sensors, to achieve a common objective of the one or more users.

2. The system, as claimed in claim 1, further comprising:
    a display interface configured to display associated sensor information.

3. The system, as claimed in claim 1, wherein the aggregator uses one or more selectable filters, each filter specifying a user-governed criterion to formalize the sensor information.

4. The system, as claimed in claim 3, wherein the user-governed criterion determining formalization of the sensor information includes declared interest associated with the user, interest comprising a brand, product, service, name, numeric identifier, or a combination thereof.

5. The system, as claimed in claim 1, wherein the aggregator utilizes a socially interacting web interface to stream the sensor information.

6. A The system, as claimed in claim 1, wherein the sensor information stored on the sensor social network is associated with one or more users who owns one or more sensors of the plurality of sensors.

7. The system, as claimed in claim 1, wherein the identity associator generates a reduced data set comprising the formalized sensor information for subsequent analytics.

8. A sensor social network system, comprising:
    a hardware processor; and
    a memory device storing processor-executable instructions, coupled to the hardware processor to execute the processor executable instructions to:
    receive a request for a user profile, the user profile including user associated information;
    receive sensor information from a plurality of sensors adapted to generate the sensor information, wherein each sensor is associated with one or more users related to each other;

derive at least one association amongst the sensor information based on at least one parameter related to at least one of the user profile, user's interest or user's objective to determine related sensors from the plurality of sensors; and analyze the sensor information of the related sensors and share the analyzed sensor information among the related sensors to achieve a common objective of one or more users.

9. The sensor social network system, as claimed in claim 8, wherein the sensor information comprises a current value, timestamp, maximum value, minimum value, units or a combination thereof.

10. The sensor social network system, as claimed in claim 8, wherein the associated information comprises a user's association with one or more users participating in the sensor social network; declared motives; sensors or group of sensors owned by the user; interested users with whom the user is willing to share information or a combination thereof.

11. A method for sensor data accumulation and analysis, the method comprising:

receiving sensor information from a plurality of sensors, wherein each sensor is associated with one or more users related to each other;

connecting the plurality of sensors via a sensor social network, and storing a plurality of user profiles and the sensor information on the sensor social network;

applying rule based filtering on the sensor information using social networking graph for transforming the sensor information into formalized sensor information via a web based aggregator;

establishing, via a processor, an association amongst the formalized sensor information based on at least one parameter related to at least one of a user profile, user's interest or user's objective to determine related sensors from the plurality of sensors; and analyzing, by the processor, the sensor information of the related sensors and sharing the analyzed sensor information, among the related sensors to achieve a common objective of the one or more users.

12. The method, as claimed in claim 11, further comprising:

displaying the associated formalized sensor information on a display interface.

13. The method, as claimed in claim 11, wherein the parameters determining the association amongst the formalized sensor information includes declared interest associated with the user, the interest comprising a brand, product, service, name, numeric identifier or a combination thereof.

14. The method, as claimed in claim 11, wherein the parameters determining the association amongst the formalized sensor information further comprises sensors or group of sensors, including physical, virtual and soft sensors owned by the user; interested users with whom the user is willing to share information or owned by an application or infrastructure or a combination thereof.

15. A non-transitory computer-readable medium storing computer-executable sensor data accumulation and analysis instructions for:

storing a plurality of user profiles and sensor information;

receiving sensor information from a plurality of sensors adapted to generate sensor information, each sensor associated with one or more users related to each other;

an aggregator implemented to use social networking graph as a rule based filtering for the sensor information to formalize sensor information and stream the formalized information to corresponding sensor data fields stored on the sensor social network;

an identity associator, deployed on the sensor social network, adapted to derive at least one association among the formalized information based on at least one parameter related to at least one of the user profile, user's interest or user's objective to determine related sensors from the plurality of sensors; and an analytical engine configured to analyze the sensor information of the related sensors and sharing the analyzed sensor information, among the related sensors to achieve a common objective of the one or more users.

16. The medium of claim 15, the medium further storing instructions for:

displaying the associated sensor information.

17. The medium of claim 15, wherein the aggregator uses one or more selectable filters, each filter specifying a user-governed criterion to formalize the sensor information.

18. The medium of claim 17, wherein the user-governed criterion determining formalization of the sensor information includes declared interest associated with the user, interest comprising a brand, product, service, name, numeric identifier, or a combination thereof.

19. The medium of claim 15, wherein the aggregator applies social networking graph as a rule based filtering for the captured sensor information and utilizes a socially interacting web interface to stream the sensor information.

20. The medium of claim 15, wherein the identity associator generates a reduced data set comprising the formalized information for subsequent analytics.

* * * * *